Figure 1:
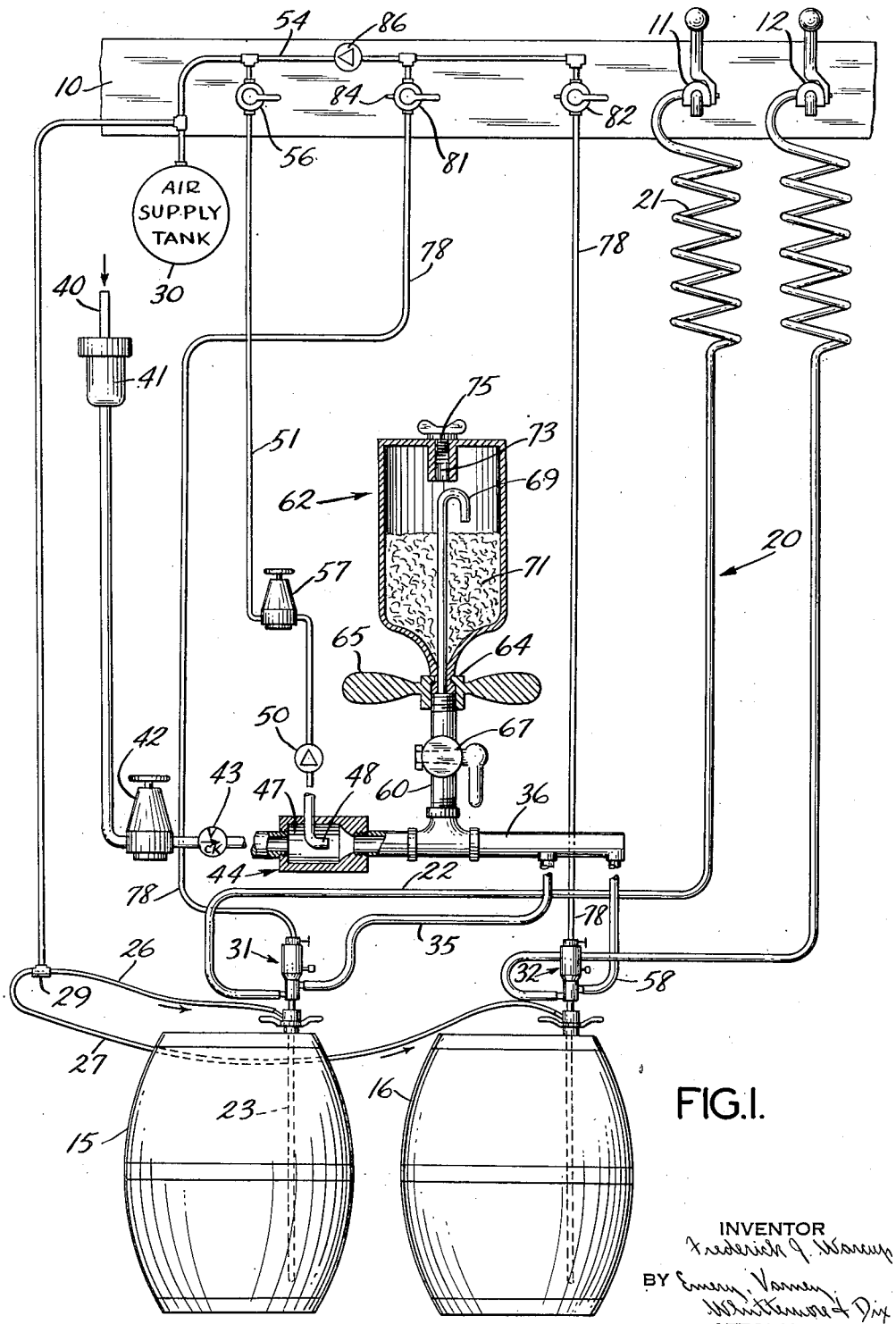

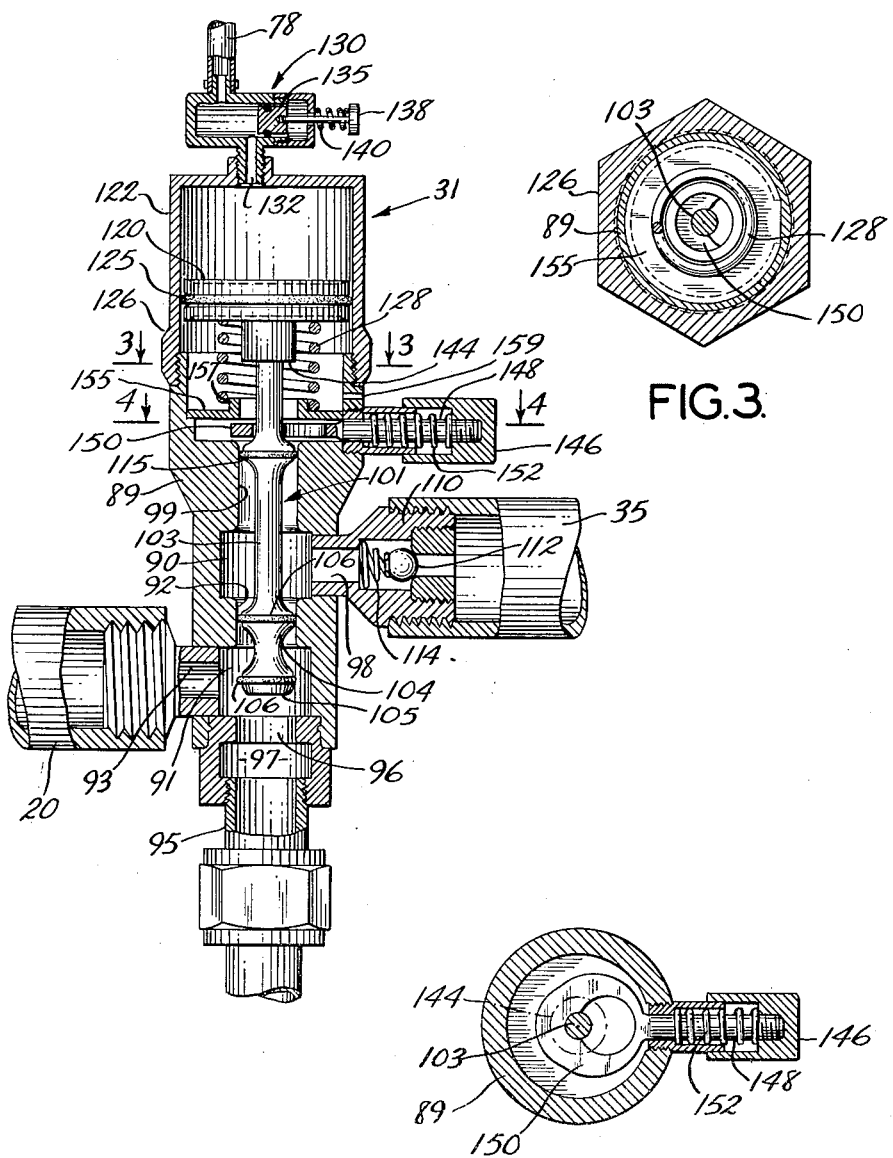

Patented Nov. 25, 1952

2,619,119

UNITED STATES PATENT OFFICE 2,619,119

FLUID PRESSURE OPERATED MULTIWAY VALVE

Frederick J. Warcup, Nyack, N. Y.

Application October 14, 1949, Serial No. 122,099

4 Claims. (Cl. 137—652)

This invention relates to apparatus for cleaning beer lines, and the invention relates more particularly to master valves for selectively connecting a beer line and a keg with a water supply.

Beer forms a coating on the inside of lines through which it passes, and this coating must be removed from time to time in order to prevent it from becoming excessive and adversely affecting the flavor of the beer. When the beer line is located in a warm place, yeast grows on the coating in the lines and flakes off into the beer stream, with the result that the beer drawn from the line is not clear.

It is an object of this invention to provide an improved valve for apparatus for cleaning beer lines. The invention includes a valve of novel construction in which valve elements are moved by a servo-motor into different positions for connecting the beer line with the tapping equipment on the keg, or with a water supply line into which chemical and/or air bubbles may be injected if desired.

In accordance with one feature of the invention, the valve means can be moved to an extreme position in which the beer line is connected with the tapping equipment and the water supply simultaneously. This makes it possible to pass water through the tapping equipment as well as through the beer line for thoroughly cleaning all passages through which the beer passes.

Other objects, features and advantages of the invention will appear or be pointed out as the description proceeds.

In the drawing, forming a part hereof, in which like reference characters indicate corresponding parts in all the views, Figure 1 is a diagrammatic view of a bear distributing system embodying this invention, Figure 2 is a greatly enlarged sectional view taken through one of the master valves shown in Figure 1, Figures 3 and 4 are sectional views taken through the valve shown in Figure 2.

Figure 1 shows a bar 10, represented diagrammatically, and beer faucets 11 and 12 for dispensing beer from kegs 15 and 16, respectively. There may be additional beer faucets on the bar, and the faucets 11 and 12 are merely representative of a plurality of faucets for dispensing beer from different kegs.

The faucet 11 is connected with the keg 15 by a beer line 20 which includes a cooling coil 21 and a flexible hose 22 connected with a rod 23 through couplings and fittings in a manner well understood in the art. The faucet 12 is similarly connected with the keg 16. Air is supplied to the kegs 15 and 16 through hoses 26 and 27 connected with a manifold 29 which is supplied with air from an air supply tank 30.

At the upper end of the beer rod 23, there is a master valve 31. This master valve is interposed in the beer line between the rod and the hose 22 in the illustrated embodiment of the invention, but it will be understood that it can be located between the hose 22 and the tubing leading to the coil 21 if desired. There is a similar master valve 32 at the upper end of the beer rod of the keg 16.

The construction of the master valve 31 will be described in connection with Fig. 2 of the drawing; and for the present it is sufficient to understand that this valve is movable into three positions, and the effect of the valve in these different positions. In one position the valve 31 connects the keg 15 directly with the beer line 20. In another position, the master valve 31 shuts off the beer line 20 from the keg and puts the beer line in communication with a hose 35 leading to a water manifold 36. In a third position, the master valve 31 puts the water hose into communication with both the beer line 20 and rod 23 simultaneously.

Water is supplied to the manifold 36 from a water supply line 40 through a vacuum breaker 41, pressure regulator 42, check valve 43, and air injection device 44. The vacuum breaker 41, pressure regulator 42 and check valve 43 are of conventional construction.

The air injection device 44 comprises a housing having a chamber 47 into which air is introduced from a nozzle 48, compressed air being supplied to this nozzle 48 through a check valve 50 from tubing 51 that leads to an air manifold 54 located on the bar. There is a manually actuated valve 56 on the bar for controlling the supply of air to the tubing 51. The air manifold 54 is connected with the air supply tank 30, but compressed air can be supplied from other sources if desired.

When the valve 56 is open, compressed air is supplied through the nozzle 48 to the water stream flowing in the air injection device 44. When the valve 56 is closed, water passes through the chamber 47 without receiving any air from the nozzle 48. The purpose of check valve 50 is to prevent water in the chamber 47 from backing up into the air supply tubing 51 in the event that there is no water flowing through the chamber 47 and the static pressure of the water exceeds the pressure in the air tubing 51. The pressure of the air at the nozzle 48 can be adjusted by a regulator 57.

At one end of the manifold 36 ahead of the branches that connect with the hose 35, and a similar hose 58 for supplying water to the master valve 32, there is a branch 60 for connection with a chemical supply tank 62. This chemical supply tank 62 is removably connected with the branch 60 by a threaded connector 64 having handles 65 by which the tank can be manually connected and disconnected from the upper end of the branch 60. There is a valve 67 commanding the branch 60, and this valve is closed when the chemical supply tank 62 is disconnected from the branch.

The opening at the lower end of the chemical supply tank 62 connects with a tube 69 leading upward to a level intermediate the upper and lower ends of the tank 62. This tube 69 has a downwardly turned end portion so that water entering the tank 62 through the tube 69 is projected downwardly from the end of the tube into a supply of granules 71 of cleaning material, such as tri-sodium phosphate. The granules are inserted into the tank 62 through a filler tube 73 at the upper end of the tank. This tube 73 is closed at its upper end by threaded plug 75.

The upper portion of the tank 62 above the open end of the tube 69 comprises an air dome into which air is compressed by the water entering the tank through the tube 69. This compressed air forces the solution of cleaning material 71 out of the tank, through the tube 69 and into the stream of water flowing to the manifold, whenever the pressure in the manifold drops as the result of the opening of a beer faucet that is in communication with the water manifold 36 through one of the master valves. The portion of the tank 62 above the lower end of the filler tube 73 serves as an air dome from which compressed air cannot leak even though the plug 75 is not air tight.

The chemical supply tank 62 is attached to the branch 60 whenever the beer lines are to be cleaned with chemical, and the serviceman can use the same tank 62 on different systems that he cleans. However, a chemical supply tank 62 can be permanently connected with the system, if desired, and can be made ineffective between cleanings by closing the valve 67.

When the tank 62 is connected to the branch 60, and the valve 67 is open, water surges into the tank 62, forming a solution of cleaner and compressing air in the top of the tank, whenever there is no water being drawn from the manifold 36 and the water in the manifold is, therefore, at its full static pressure. Whenever water flows from the manifold to an open faucet, the pressure in the manifold drops and the compressed air in the chemical supply tank 62 forces cleaning solution to flow to the manifold 36. Since the pressure drop in the manifold is proportional to the rate of flow from the open faucet, the supply of cleaner from the tank 62 to the water stream is proportional to the rate of flow of the water stream.

In a similar way, the flow of air into the water stream from the nozzle 48 is proportional to the rate of water flow through the air injection device 44 because the greater the drop in pressure in the chamber 47, the more rapidly will the air flow into the water in the chamber through the nozzle 48. One difference, however, in the air supply and chemical solution supply is that the compressed air above the chemical solution drops in pressure and will only discharge a limited amount of cleaning solution each time a faucet is opened, whereas the air supply to the nozzle 48 is preferably maintained at substantially constant pressure by means of a pump or pressure regulator.

The nozzle 48 has a small discharge outlet, or group of outlets, so that it supplies air in the form of small bubbles. Experience has shown that water containing these bubbles of compressed air exerts a cleaning action equivalent to, or better than, water containing sand or other abrasives, but the obvious disadvantages of solid abrasives is avoided with this invention. The cleaning of the beer lines with the bubble-filled water streams can be carried on without the use of chemicals. The chemical tank 62 provides means for sterilizing and cleaning lines that have been allowed to stand without cleaning until they have accumulated substantial deposits on their inside surfaces.

Each of the master valves 31 and 32 is operated by a servomotor located at the upper end of the valve housing and supplied with air through tubing 78. The supply of air to and from the tubing 78 which connects with the master valve 31 is controlled by a three way air cock 81 located on the bar and connected with the air manifold 54. The supply of air into and out of the tubing 78 which leads to the servomotor of the other master valve 32 is controlled by a similar three way valve 82 located on the bar and connected with the manifold 54.

When the valve 81 is in one position it connects the manifold 54 to the servomotor of the master valve 31; but when the valve 81 is in another position it puts the tubing 78 from the servomotor in communication with an exhaust port 84 of the valve 81. The operation of the air cock 82 is similar.

There is a check valve 86 in the manifold 54 between the valve 56 and the three way cocks 81 and 82. This check valve 86 prevents back flow of air from the air cocks 81 and 82 so that if the valve 56 is left open indefinitely and causes a drop in the pressure of the air, it is not possible for such a drop in pressure to cause a partial exhaust of air from either or both of the servomotors that may be connected with the manifold 54 through the air cock 81 or 82.

Figure 2 shows the internal construction of the master valve 31. This valve includes a housing 89 enclosing two chambers 90 and 91 which are connected by a port 92. The beer line 20 connects with the chamber 91 through an inlet 93 which is open at all times. The rod 23 connects with the chamber 91 through a conduit 95 having a port 96 and having an enlarged portion 97 upstream from the port 96 as shown in Fig. 2.

The upper chamber 90 above the port 92 connects with the water supply line 35 through a permanently open water inlet 98; and there is one other opening through the side of the valve housing, this other opening comprising a passage 99 in axial alignment with the ports 92, and 96.

A reciprocating valve element 101 extends through the passage or opening 99 along the common axis of the chambers 90 and 91, and the ports 92 and 96. This reciprocating valve element comprises a valve stem 103 and two valve heads 104 and 105, the valve heads being merely portions of the stem of increased diameter, in the construction illustrated.

Each of the valve heads 104 and 105 has a circumferential groove that holds an O-ring 106.

The term "O-ring" is used herein to designate a compressible ring of rubber or similar material, and having the shape of a toris or anchor ring. Each O-ring extends radially beyond the circumferential groove in which it is held, and fits loosely enough in the groove to roll to some extent when the valve element moves axially through a port with which the O-ring comes in contact.

The ports 92 and 96 have their side walls diverging toward the ends of the ports; and the diameter and divergence of these ports are so correlated with the size of the O-rings 106 that the O-rings seal the ports with a wedge action as they are moved into the ports by the reciprocating motion of the valve element 101.

When the valve element 101 is in the position shown in Fig. 2, the valve head 104 and its associated O-ring 106 seal the port 92 so that no water can enter the beer line 20, but the beer line is in direct communication with the keg through the conduit 95 and its port 96.

The valve heads 104 and 105 are spaced from one another by an axial distance somewhat greater than the effective spacing of the ports 92 and 96 so that as the valve element 101 moves downwardly, the valve head 105 and its associated O-ring 106 enter into and seal the port 96 before the valve element 104 and its associated O-ring move out of the port 92. This shuts off the connection between the keg and the beer line 20, before communication is established between the water line 35 and the beer line 20. The advantage of this feature is that the valve never moves into a position that would permit beer and water to mix even though the air or gas pressure supplied to the servomotor is too low to push the piston as far as it should against the pressure of the servomotor spring.

When the valve head 104 first moves out of the port 92, water flows into the chamber 91 and into the beer line 20, but the valve head 105 closes the port 96. Further downward movement of the valve element 101 brings the valve head 105 into the enlarged portion 97 where the clearance between the port 96 and the valve stem permits water in the chamber 91 to flow through the port 96 and into the conduit 95 to the beer rod for washing out the beer rod after the keg has become empty and before tapping the new keg.

Just beyond the water port 98, there is a bushing 110 with a seat at its inner end. A ball check valve 112 is held against this seat by a spring 114. This check valve permits water to flow into the valve housing but it prevents any back flow of liquid from the valve housing 89 into the water line 35.

There is an enlarged portion of the valve stem 103 in the opening 99 with a circumferential groove and an O-ring 115 sealing the passage 99 against the flow of water from the housing. This O-ring 115 takes the place of the conventional packing commonly used with reciprocating rods.

An actuator comprising a piston 120 is connected to the upper end of the valve stem. This piston fits freely in a cylinder formed in a cap 122 that is threaded at its lower end to the valve housing 89. The piston 120 has a piston ring which preferably comprises on O-ring 125, similar to the O-rings on the valve heads, but of larger diameter. The outside surface of the cap 122 has a hexagonal portion 126 for receiving a wrench to screw the cap on the valve housing or to unscrew the cap from the valve housing.

The piston 120 is urged upward by a spring 128 and the piston is pushed downward by the pressure of air supplied through the tubing 78, and through a manually actuated relief valve 130, to a cylinder port 132. The piston 120 with the cylinder in the cap 122 and spring 128 comprise the servomotor of the master valve.

Although pressure in the cylinder can be relieved at any time by opening the exhaust port of the air cock on the bar as previously explained in connection with Figure 1, the manually actuated relief valve 130 provides a means for exhausting the cylinder at the servomotor itself. A valve element 135 of the valve 130 can be shifted into position to allow exhaust of the air from the port 132 through the housing of the valve 130 by pushing a button 138 connected with the valve element 135. The valve element 135 and button 138 are normally held, by a coil spring 140, in the position illustrated in Fig. 2. With the parts in this position, the tubing 78 is in direct communication with the cylinder port 132.

In the normal operation of the servo-motor, the air pushes the piston 120 down until the shoulder 144 on the valve stem strikes against an abutment. When the servo-motor reaches this position, the valve head 105 seals the port 96, and the port 92 is open. In order to let the servomotor move further so that the beer line and the conduit to the beer rod are in communication with the water supply line simultaneously, the abutment is removed from the path of the shoulder 144 by pushing a button 146.

This button 146 is connected with one end of a stem 148 extending through an opening in the side of the valve housing. The stem 148 is a part of a plate 150 in which there is an opening for passage of the valve stem 103. The opening has a portion of substantially the same diameter as the cross section of the valve stem 103 below the shoulder 144. The edge of this portion of the opening serves as the abutment against which the shoulder 144 contacts. In order to remove this abutment from the path of the shoulder, the plate 150 is moved transversely to the axis of the valve stem by pushing the button 146 so as to shift the plate and bring the enlarged portion of the opening under the shoulder 144. This enlarged portion of the opening has a diameter equal to the maximum diameter of the valve stem, above the shoulder 144, so that the piston can move downward to the lower end of its stroke.

The button 146 is urged outward by a coil spring 152 and when in its outward position, the stem 148 and plate 150 are in the positions shown in Fig. 4, with the edge of the small diameter portion of the plate opening pressed against the valve stem.

The plate 150 is located under a washer 155 which rests on a shoulder in the valve housing so as to leave clearance for the free movement of the plate 150 under the washer. This washer 155 has a ridge 157 around its center opening and this ridge serves as a guide for the spring 128. There is a drain opening 159 through the valve housing for the escape of any water which leaks past the O-ring 115.

In the operation of the valve, the initial movement of the servo-motor shifts the piston downward until the abutment 144 strikes against the edges of the small diameter opening through the plate 150, and the valve heads will thus stop in position to put the water line in communication with the beer line while the conduit to the keg is sealed against the entrance of water. It is only when the rod is removed from the keg or the keg is empty that any further movement of the servo-motor is desirable.

When the rod is to be washed, the button 146 is pushed to shift the plate 150 and allow the servo-motor to move further and shift the valve heads into positions to put the water line into communication with the beer line and beer rods simultaneously.

If it becomes desirable to bring the servo-motor back to its initial position, without coming up to the bar to operate the remote control air cock, the return of the servo-motor can be effected by pushing the button 138 so as to open the relief valve 130. Air escapes from the open relief valve 130 fast enough to reduce the pressure in the cylinder 122 below that required to move the piston against the spring 128.

The spring 128 pushes the servo-motor piston upward until the shoulder 144 passes the plate 150 and unless the attendant is holding the button 146, the spring 152 will shift the plate into position to block downward movement of the shoulder 144 beyond the plate. The button 138 of the relief valve can then be released, and the compressed air supply through the tubing 76 will hold the servo-motor piston down as far as it can go with the shoulder 144 against the plate 150.

The preferred embodiment of the invention has been illustrated and described, but changes and modifications can be made and some features can be used alone or in different combinations without departing from the invention as defined in the claims.

What is claimed is:

1. For connecting a water line selectively with a beer keg, a beer line or both, a valve comprising a housing having a first inlet, a second inlet and an intermediate first outlet chamber, a reciprocating valve element operable in one position to put the first inlet in communication with the intermediate chamber only, and operable in another position to put the second inlet in communication with the first inlet and intermediate chamber simultaneously, a servo-motor for moving the valve element in the valve housing, an inlet port through which compressed air is supplied as working fluid to the servo-motor, spring means urging the servo-motor in a direction opposite to that which it is moved by the compressed air, a shoulder fixed relatively to said valve element, a stop in the path of said shoulder disposed to prevent said servo-motor from moving the valve element from said one position to said other position, means for moving the stop out of position so that the servo-motor can make a complete stroke, and resilient means urging the stop back into its original position.

2. For connecting a beer line selectively with a water line, a beer keg or both the water line and beer keg simultaneously, a valve comprising a housing having an inlet, an inlet chamber and an intermediate outlet chamber, a first throat interconnecting the inlet with the intermediate chamber and a second throat aligned with the first throat and interconnecting the intermediate chamber and the inlet chamber, movable in the housing a valve stem having a pair of valves for entering and closing said throats, said stem being movable axially of the throats between a first position in which one valve closes said first throat and a second position in which the other valve closes the second throat, the spacing between said valves being at least equal to the length of said intermediate chamber but less than the length of said intermediate chamber plus the length of one of said throats so that said valves close both throats while the stem is moved between said positions, the stem being movable beyond said second position to a third position in which said valves advance out of said throats so that both of said inlets communicate with said intermediate chamber, said stem having a shoulder and said housing carrying a stop in the path of said shoulder to prevent the stem from moving into said third position, means yieldingly holding the stop in the path of said shoulder, and motor means for moving the stem from said first position and yieldingly urging the shoulder against the stop, said stop being movable out of the path of the shoulder to allow the stem to be moved to said third position.

3. For connecting a beer line selectively with a water line, a beer keg or both the water line and beer keg simultaneously, a valve comprising a housing having an inlet, an inlet chamber and an intermediate outlet chamber, a first throat interconnecting the inlet with the intermediate chamber and a second throat aligned with the first throat and interconnecting the intermediate chamber and the inlet chamber, movable in the housing a valve stem having a pair of valves for entering and closing said throats, said stem being movable axially of the throats between a first position in which one valve closes said first throat and a second position in which the other valve closes the second throat, the spacing between said valves being at least equal to the length of said intermediate chamber but less than the length of said intermediate chamber plus the length of one of said throats so that said valves close both throats while the stem is moved between said positions, the stem being movable beyond said second position to a third position in which said valves advance out of said throats so that both of said inlets communicate with said intermediate chamber, a shoulder on the valve stem outside of the valve housing, a plate with an opening through which the valve stem passes, a portion of the opening being of a size insufficient for passage of the shoulder on the valve stem so that edges of the opening comprise an abutment for stopping the stroke of the stem, motor means for moving the stem from said first position and yieldingly urging the shoulder against the abutment, a manually actuated device that pushes the plate into position to bring another opening under the shoulder of the valve stem, said other opening being of a size sufficient to provide space for passage of the shoulder of the valve stem, and a spring urging the plate back into its original position upon release of the manually actuated device.

4. For connecting a water line selectively with a beer keg, a beer line or both, a valve comprising a housing having a first inlet, a second inlet and an intermediate outlet chamber, a reciprocating valve element operable in one position to put the first inlet in communication with the intermediate chamber only, and operable in another position to put the second inlet in communication with the first inlet and intermediate chamber simultaneously, a servo-motor for moving the valve element in the valve housing, an inlet port through which compressed air is supplied as working fluid to the servo-motor, spring means urging the servo-motor in a direction opposite to that which is moved by the compressed air, a shoulder fixed relatively to said valve element, a stop in the path of said shoulder disposed to prevent said servo-motor from moving the valve element from said one position to said other position, means for moving the stop out of position so that the servo-motor can make a complete stroke, resilient means urging the stop back into its original position, and a manually actuated relief valve for exhausting air from the servo-motor in order to permit the spring to return the servo-motor far enough to cause the stop to return to its effective position.

FREDERICK J. WARCUP.

REFERENCES CITED

The following references are of record in the file of this patent:

UNITED STATES PATENTS

| Number | Name | Date |
|---|---|---|
| 318,247 | Harvey | May 19, 1885 |
| 900,260 | Boyd | Oct. 6, 1908 |
| 927,893 | Steiger | July 13, 1909 |
| 1,461,835 | Stroud | July 17, 1923 |
| 2,011,323 | Remick | Aug. 13, 1935 |
| 2,023,854 | Petricone | Dec. 10, 1935 |
| 2,076,414 | Panagopoulos | Apr. 6, 1937 |
| 2,189,950 | Gump | Feb. 13, 1940 |
| 2,206,957 | Hose | July 9, 1940 |
| 2,213,309 | Fortune | Sept. 3, 1940 |
| 2,285,655 | Heinemann | June 9, 1942 |
| 2,307,963 | Shafer | Jan. 12, 1943 |
| 2,358,228 | Hoof | Sept. 12, 1944 |
| 2,414,451 | Christensen | Jan. 21, 1947 |
| 2,458,230 | Warcup | Jan. 4, 1949 |